US011760519B2

(12) United States Patent
Morikubo et al.

(10) Patent No.: US 11,760,519 B2
(45) Date of Patent: Sep. 19, 2023

(54) ARTICLE TRANSPORT FACILITY

(71) Applicant: Daifuku Co., Ltd., Osaka (JP)

(72) Inventors: Mitsuo Morikubo, Tokyo (JP); Yoshikazu Tai, Tokyo (JP); Masami Iwai, Tokyo (JP); Atsushi Minoo, Tokyo (JP)

(73) Assignee: Daifuku Co., Ltd., Osaka (JP)

( * ) Notice: Subject to any disclaimer, the term of this patent is extended or adjusted under 35 U.S.C. 154(b) by 373 days.

(21) Appl. No.: 17/293,606

(22) PCT Filed: Nov. 12, 2019

(86) PCT No.: PCT/JP2019/044370
§ 371 (c)(1),
(2) Date: May 13, 2021

(87) PCT Pub. No.: WO2020/100906
PCT Pub. Date: May 22, 2020

(65) Prior Publication Data
US 2022/0017249 A1 Jan. 20, 2022

(30) Foreign Application Priority Data
Nov. 14, 2018 (JP) .................................. 2018-213659

(51) Int. Cl.
*B65B 5/04* (2006.01)
*B65B 35/16* (2006.01)
(Continued)

(52) U.S. Cl.
CPC .................. *B65B 35/16* (2013.01); *B65B 5/04* (2013.01); *B65B 35/56* (2013.01); *B65B 57/00* (2013.01); *B65G 47/91* (2013.01); *B65G 61/00* (2013.01)

(58) Field of Classification Search
CPC ........... B65B 5/04; B65B 35/56; B65B 57/00; B65B 35/16; B65B 5/08; B65B 5/105;
(Continued)

(56) References Cited

U.S. PATENT DOCUMENTS

| 6,201,203 B1 | 3/2001 | Tilles |
| 2014/0094945 A1* | 4/2014 | Hormann .................. B25J 9/16 700/83 |

(Continued)

FOREIGN PATENT DOCUMENTS

| JP | 201839613 A | 3/2018 |
| WO | 2015086559 A1 | 6/2015 |
| WO | 2016074972 A1 | 5/2016 |

*Primary Examiner* — Chinyere J Rushing-Tucker
(74) *Attorney, Agent, or Firm* — THE WEBB LAW FIRM

(57) ABSTRACT

A transfer device and a control device for controlling the transfer device are provided. The control device is configured to execute setting control to set a storing position, in a container, of each of a plurality of articles to be stored in the container, storage control to control the transfer device so as to store each of the articles at the storing position, and replacement control to replace one of a first holding portion and a second holding portion attached to the attachment portion with the other one. The setting control is control to set the storing position in accordance with an order of transferring the plurality of articles so as to sequentially place the articles from a reference position that is set at a position adjacent to a side wall portion.

10 Claims, 9 Drawing Sheets

(51) Int. Cl.
  *B65B 35/56*   (2006.01)
  *B65B 57/00*   (2006.01)
  *B65G 47/91*   (2006.01)
  *B65G 61/00*   (2006.01)

(58) Field of Classification Search
  CPC ...... B65G 47/918; B65G 61/00; B65G 57/04;
   B65G 59/04; B65G 60/00; B65G 47/91;
   B25J 9/16; B25J 15/06
  USPC .......................................................... 53/235
  See application file for complete search history.

(56) References Cited

U.S. PATENT DOCUMENTS

| | | | |
|---|---|---|---|
| 2015/0209964 A1* | 7/2015 | Akama | B25J 9/0051 |
| | | | 294/183 |
| 2016/0311633 A1 | 10/2016 | Enenkel | |
| 2018/0065818 A1* | 3/2018 | Gondoh | B65G 47/24 |
| 2018/0065819 A1* | 3/2018 | Gondoh | B65G 61/00 |
| 2018/0229948 A1 | 8/2018 | Kollmuss et al. | |
| 2019/0177095 A1* | 6/2019 | Ukisu | B65G 47/52 |
| 2021/0253375 A1* | 8/2021 | Gondoh | B65G 47/917 |

* cited by examiner

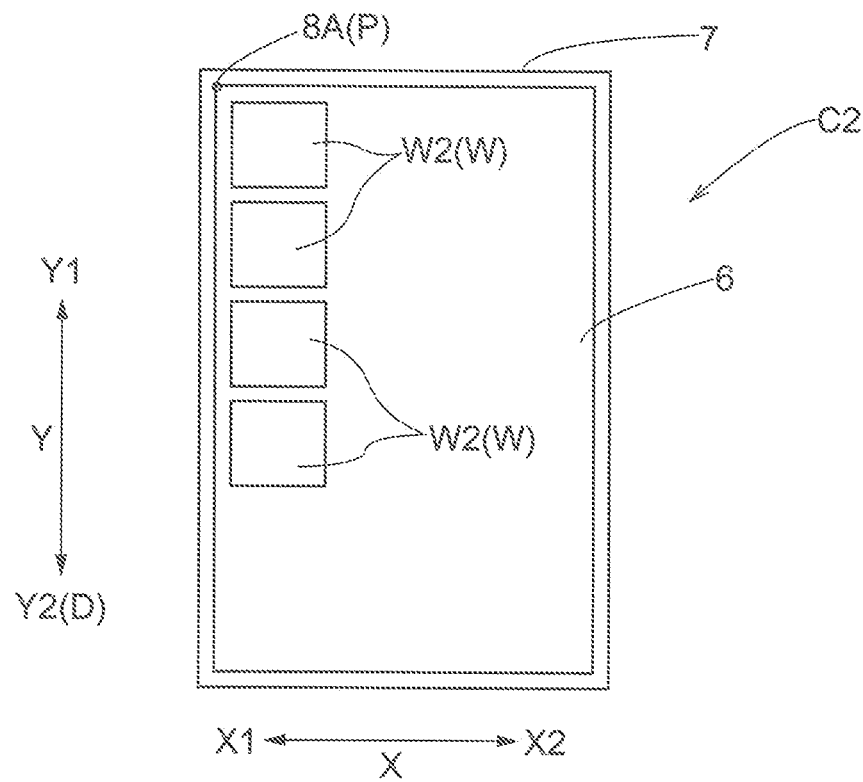
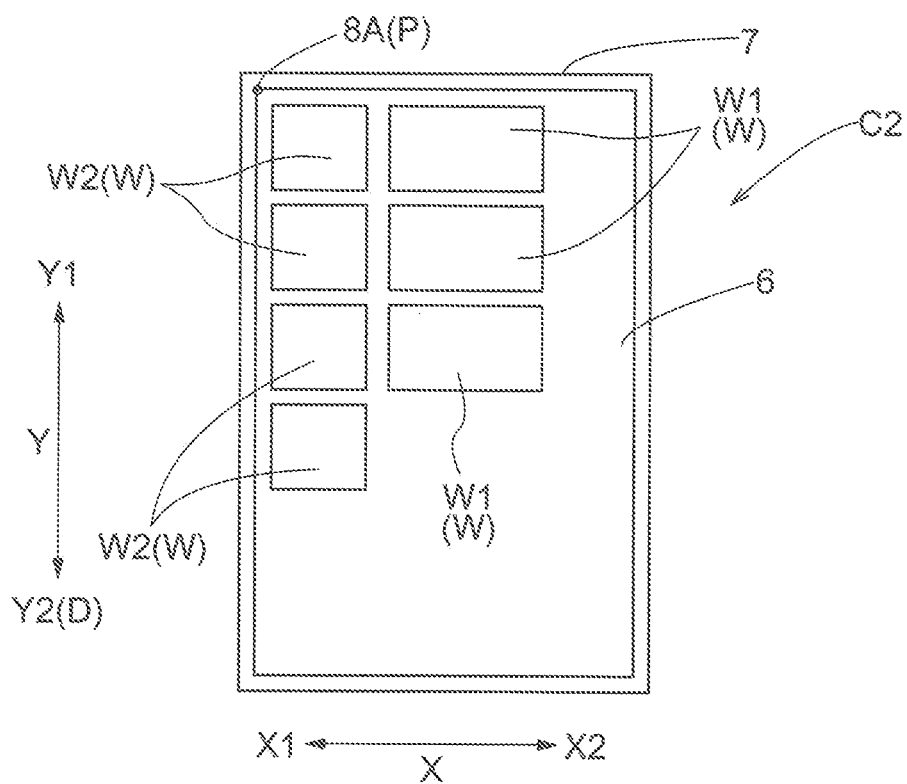

ARTICLE TRANSPORT FACILITY

CROSS-REFERENCE TO RELATED APPLICATIONS

This application is the United States national phase of International Application No. PCT/JP2019/044370 filed Nov. 12, 2019, and claims priority to Japanese Patent Application No. 2018-213659 filed Nov. 14, 2018, the disclosures of which are hereby incorporated by reference in their entirety.

BACKGROUND OF THE INVENTION

1. Field of the Invention

The present invention relates to an article transport facility that includes a transfer device that performs a transfer operation to hold an article and store the article in a container, and a control device that controls the transfer device.

2. Description of Related Art

The background art will be described below. In the following description, signs or names in brackets are those used in the prior art documents. A conventional example of such an article transport facility is described in JP 2018-039613A (Patent Document 1). In the article transport facility described in Patent Document 1, a control device (H) sets a storing position in a container (first container C1) at which each of a plurality of articles to be stored therein are stored by executing arrangement setting processing, and the control device controls a transfer device so as to store the plurality of articles at respective storing positions by executing transport-transfer processing.

Patent Document 1: JP 2018-039613A

SUMMARY OF THE INVENTION

In the article transport facility described in Patent Document 1, an article before being stored in a container is in a proper orientation, but there are cases where, when an article is stored in the container, the orientation of the article is selected from the proper orientation or an orientation other than the proper orientation and then the article is stored, in order to increase storage efficiency of the article with respect to the container. However, to thus store articles in different orientations in a container, a step of changing the orientation of each article needs to be executed by the transfer device. To execute this step, for example, the time required to store articles in a container is likely to be longer because, for example, the number of operational steps of the transfer device increases and the time required for the transfer operation is elongated, and because the transfer device needs to be switched between different configurations depending on the orientation of each article. In order to increase processing efficiency, the time required for transfer needs to be shortened.

It is desirable to realize an article transport facility with which the time required to store articles in a container can be shortened while increasing storage efficiency of storing the articles in the container.

In view of the foregoing, a characteristic configuration of an article transport facility lies in an article transport facility including: a transfer device that performs a transfer operation to hold an article and store the article in a container; and a control device that controls the transfer device, wherein the container has a placement portion for placing an article thereon, and a side wall portion erected around the placement portion, assuming that orientations of the article to be stored in the container include a first orientation and a second orientation in which an area in contact with the placement portion is smaller than that in the first orientation when article is in a state of being placed on the placement portion, an article to be stored in the first orientation in the container is a first article, and an article to be stored in the second orientation in the container is a second article, the transfer device includes a first holding portion for holding the first article, a second holding portion for holding the second article, an attachment portion to which one of the first holding portion and the second holding portion is selectively attached, and a moving portion for moving the first holding portion or the second holding portion that is attached to the attachment portion, the control device is configured to execute setting control to set a storing position, in the container, of each of a plurality of articles to be stored in the container, storage control to control the transfer device so as to store each of the plurality of articles at the storing position, and replacement control to replace one of the first holding portion and the second holding portion that is attached to the attachment portion with the other one, the setting control is control to set the storing position in accordance with an order of transferring the plurality of articles so as to sequentially place the articles from a reference position that is set at a position adjacent to the side wall portion, and the control device executes the storage control for all second articles, of a plurality of articles to be stored in one container, then executes the replacement control to replace the second holding portion attached to the attachment portion with the first holding portion, and thereafter executes the storage control for all first articles.

According to this configuration, an article can be stored in the first orientation in the container by the transfer device by attaching the first holding portion to the attachment portion of the transfer device, and an article can be stored in the second orientation in the container by the transfer device by attaching the second holding portion to the attachment portion of the transfer device. Thus, when an article is stored in a container, either the first orientation or the second orientation can be selected to store the article, and therefore, storage efficiency of storing articles in the container can be increased. Here, in the second orientation, the area in contact with the placement portion is smaller than that in the first orientation, and therefore, the orientation stability in the second orientation is lower than that in the first orientation. For this reason, the orientation stability of the second article in the container can be more readily increased using the side wall portion by storing, in the container, the second article to be stored in the second orientation, prior to the first article, so as to sequentially arrange the articles from the reference position adjacent to the side wall portions of the container.

After the storage control has been executed for all second articles, of the plurality of articles to be stored in one container, the replacement control to replace the second holding portion attached to the attachment portion with the first holding portion is executed, and thereafter the storage control is executed for all first articles. Thus, the holding portion need only be replaced only once during the entire transfer operation for the articles with respect to one container. Accordingly, the time required for transfer can be shortened compared with the case of replacing the holding portion more than once.

BRIEF DESCRIPTION OF THE DRAWINGS

FIG. 11 is a plan view of the second container with second articles stored therein.

FIG. 12 is a plan view of the second container with first articles stored therein.

DETAILED DESCRIPTION OF PREFERRED EMBODIMENTS

1. Embodiment

An embodiment of an article transport facility will be described based on the drawings.

Figure 1:
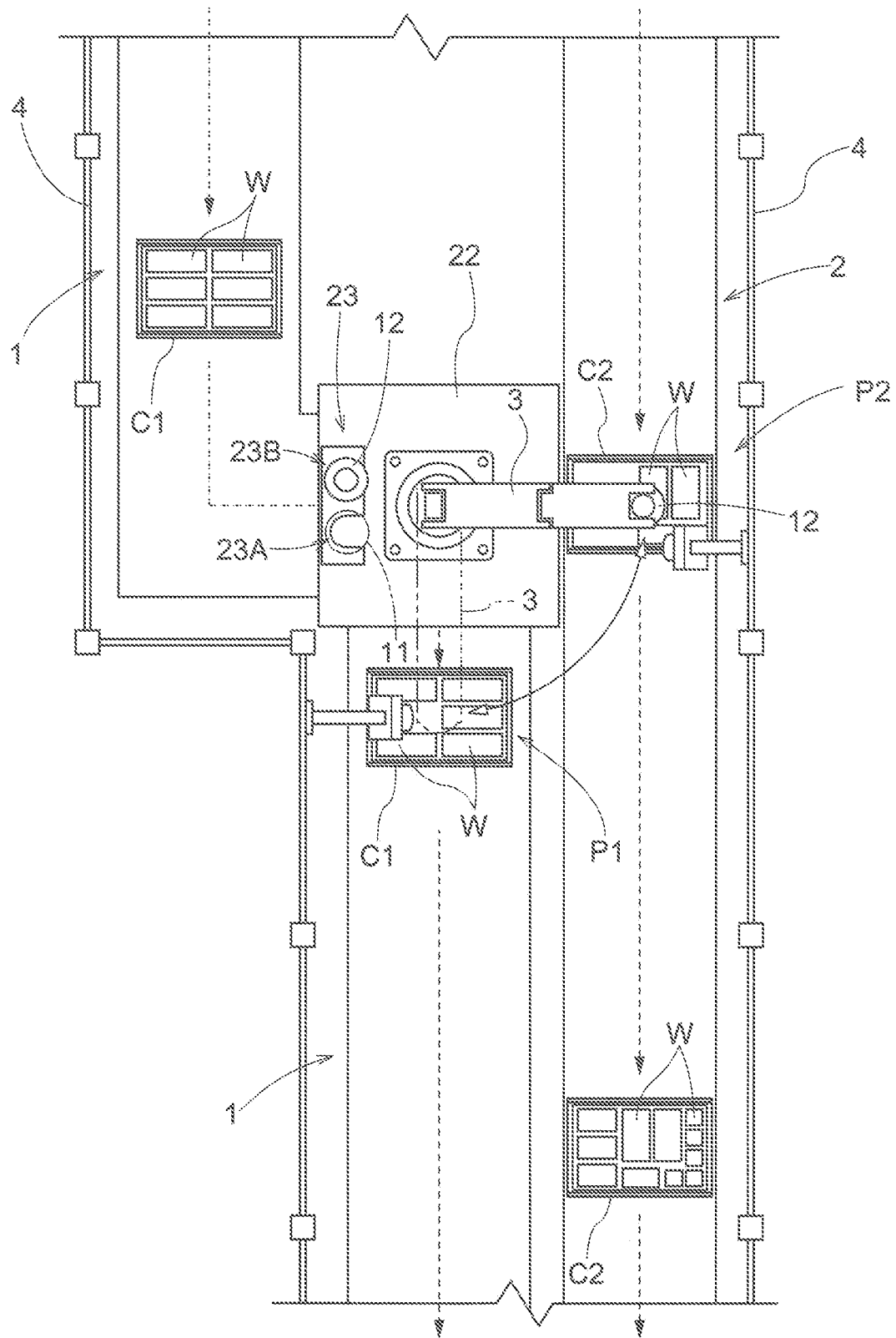
FIG. 1 is a plan view of an article transport facility.

As shown in FIG. 1, the article transport facility includes a first transport device 1 for transporting first containers C1, a second transport device 2 for transporting second containers C2, a transfer device 3 for transferring articles W from the first containers C1 to the second containers C2, and a fence 4 that surrounds a region in which the first transport device 1, the second transport device 2, and the transfer device 3 are installed.

The first transport device 1 is constituted by a roller conveyor, and transports the first containers C1 in one direction as indicated by arrows in FIG. 1. A first position P1 is set on a transport path of the first transport device 1. The first transport device 1 performs a first transport operation to transport, from the first position P1, a first container C1 located at the first position P1, and transport another first container C1 to the first position P1. One or more articles W are stored in each first container C1 transported to the first position P1 by the first transport device 1. In the present embodiment, the same types of articles W are stored in the same orientation in one first container C1.

The second transport device 2 is constituted by a roller conveyor, and transports the second containers C2 in one direction as indicated by arrows in FIG. 1. A second position P2 is set on a transport path of the second transport device 2. The second transport device 2 performs a second transport operation to transport, from the second position P2, a second container C2 located at the second position P2, and transport another second container C2 to the second position P2. No article W is stored in the second container C2 transported to the second position P2 by the second transport device 2, whereas one or more types of articles W that have been stored by the transfer device 3 are stored in the second container C2 transported from the second position P2.

In a picking facility, a first container C1 in which articles W are stored is transported to the first position P1 by the first transport device 1, and an empty second container C2 is transported to the second position P2 by the second transport device 2. The transfer device 3 holds and takes out an article W stored in the first container C1 located at the first position P1, stores the taken article W in the second container C2 located at the second position P2 and then releases the article W, thereby transferring the article W from the first container C1 to the second container C2. Thus, the transfer device 3 performs a transfer operation to hold an article W and store the article W in the second container C2. The first container C1 from which all articles W that are to be taken out have been taken out is transported from the first position P1 by the first transport device 1. The second container C2 in which all articles W to be stored have been stored is transported from the second position P2 by the second transport device 2.

Figure 2:
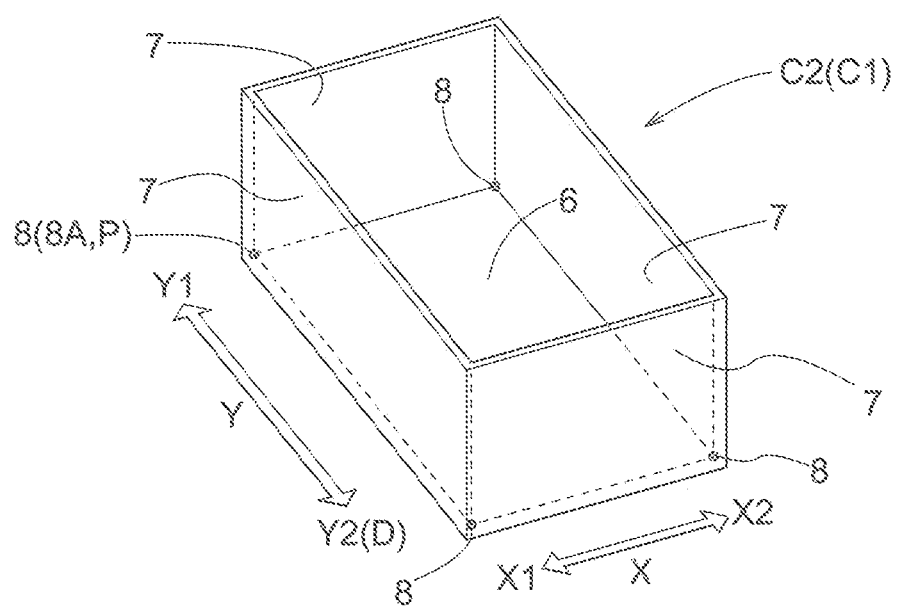
FIG. 2 is a perspective view of a second container.

As shown in FIG. 2, each second container C2 has a placement portion 6 on which the articles W are to be placed and side wall portions 7 that are erected around the placement portion 6, and is formed to have a box shape that is open in an upper face thereof. In the present embodiment, the placement portion 6 has a rectangular shape, and the side wall portions 7 are provided along the four sides of the placement portion 6. The first container C1 has a placement portion 6 and side wall portions 7 similarly to the second container C2. In the present embodiment, the first container C1 has the same shape as the second container C2. Note that the second container C2 corresponds to a container for storing the articles W.

As shown in FIGS. 1 and 2, the second container C2 is transported in an orientation in which the shorter direction X of the second container C2 is parallel to the transport direction of the second transport device 2, by the second transport device 2. For this reason, the second container C2 is located at the second position P2 in an orientation in which the shorter direction X of the second container C2 is parallel to the transport direction of the second transport device 2, and the longer direction Y of the second container C2 is parallel to the width direction of the second transport device 2. Note that the width direction is a direction orthogonal to the transport direction as viewed in the vertical direction. The placement portion 6 has four corner portions 8, and one of the four corner portions 8 is a target corner portion 8A. In the present embodiment, the side in the shorter direction on which the target corner portion 8A is present with respect to the center of the second container C2 is a first side X1 in the shorter direction X, and the opposite side is a second side X2 in the shorter direction. The side in the longer direction Y on which the target corner portion 8A is present with respect to the center of the second container C2 is a first side Y1 in the longer direction, and the opposite side is a second side Y2 in the longer direction.

Orientations of an article W to be stored in the second container C2 includes a first orientation, and a second orientation in which the area of the article W in contact with the placement portion 6 when the article is in a state of being placed on the placement portion 6 of the second container C2 is smaller than that when the article W is in the first orientation. In the present embodiment, each article W has a rectangular-parallelepiped shape. The first orientation is an orientation in which, of three pairs of surfaces of the article W, one of the surfaces with the largest area faces the placement portion 6, and the second orientation is an orientation in which, of the three pairs of surfaces of the article W, one of the surfaces with the smallest area faces the placement portion 6. In the present embodiment, articles W are stored in the first orientation in the first container C1. Articles W are stored in the first orientation or the second orientation in the second container C2. That is to say, the articles W stored in the first container C1 include an article W (first article W1) that is to be stored in the second container C2 while keeping the first orientation, and an article W (second article W2) that is to be stored in the second orientation in the second container C2 after the orientation thereof is changed from the first orientation to the second orientation. In the following, there are cases where an article W stored in the first orientation in the second container C2 is referred to as a first article W1, and an article W stored in the second orientation in the second container C2 is referred to as a second article W2.

Figure 3:
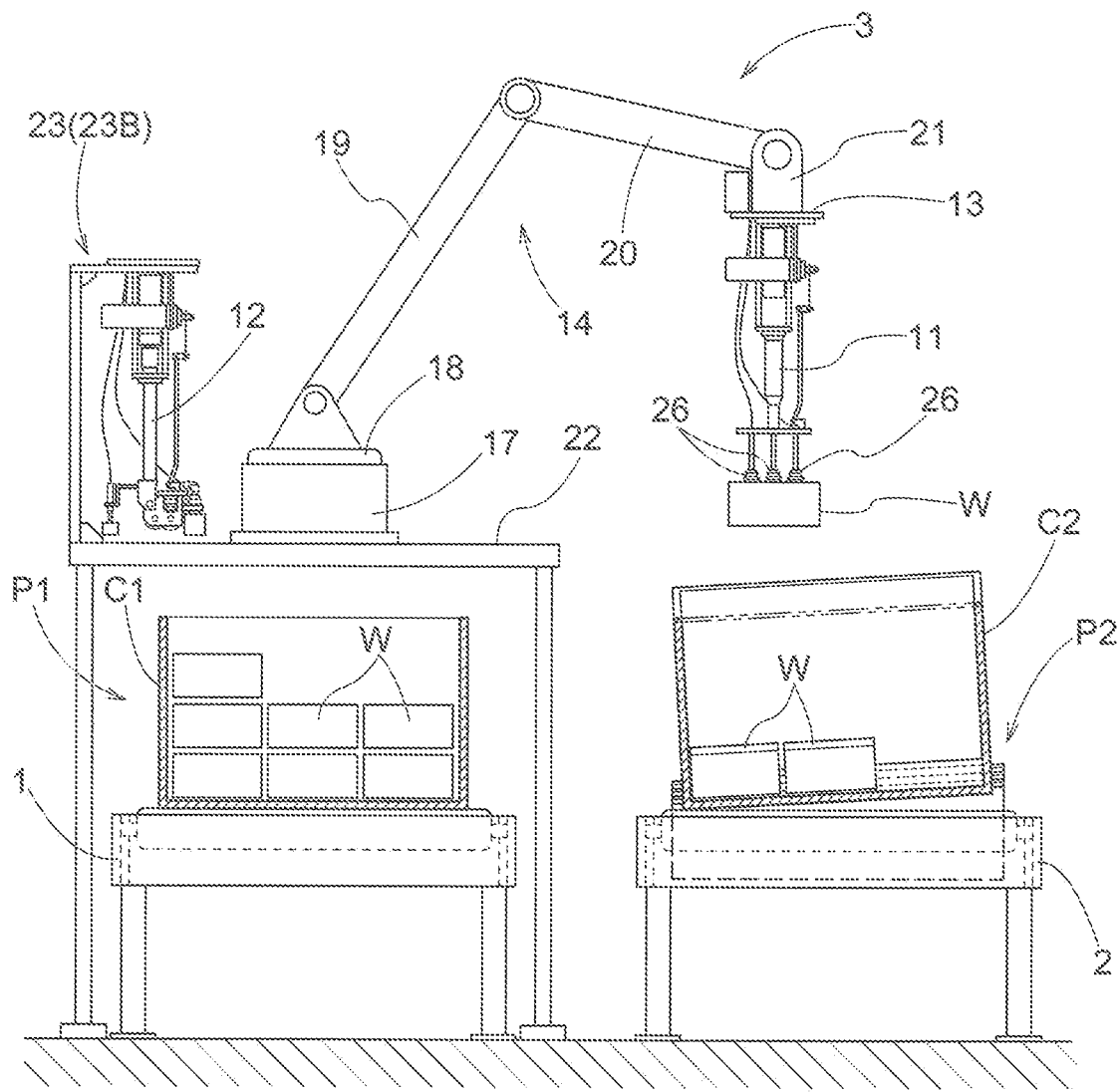
FIG. 3 is a front elevational view of the article transport facility with a first holding portion attached to an attachment portion.
Figure 4:
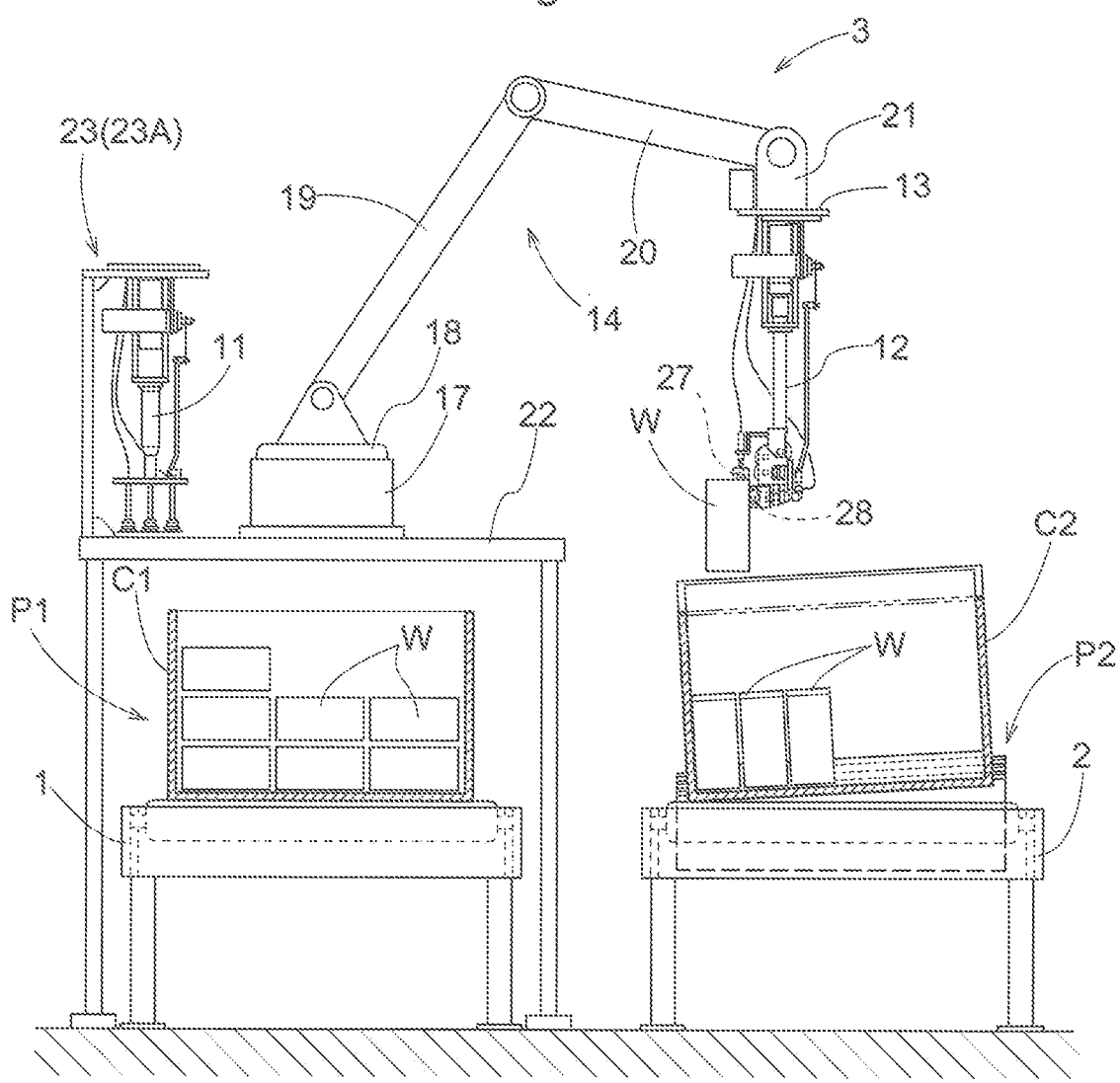
FIG. 4 is a front elevational view of the article transport facility with a second holding portion attached to the attachment portion.

Next, the transfer device 3 will be described. As shown in FIGS. 3 and 4, the transfer device 3 includes a first holding portion 11 for holding a first article W1, a second holding portion 12 for holding a second article W2, an attachment portion 13 to which one of the first holding portion 11 and the second holding portion 12 is selectively attached, and a moving portion 14 for moving the first holding portion 11 or the second holding portion 12 attached to the attachment portion 13.

The moving portion 14 includes a base portion 17, a rotary portion 18, a first arm 19, a second arm 20, and a third arm 21. The base portion 17 is fixed to a mount 22. The rotary portion 18 is supported by the base portion 17 so as to be able to rotate around an axis parallel to the vertical direction. A base end portion of the first arm 19 is pivotably coupled to the rotary portion 18. A base end portion of the second arm 20 is pivotably coupled to a leading end portion of the first arm 19. A base end portion of the third arm 21 is pivotably coupled to a leading end portion of the second arm 20. The attachment portion 13 is provided at a leading end portion of the third arm 21. One of the first holding portion 11 and the second holding portion 12 is selectively attached to the attachment portion 13. The moving portion 14 moves the first holding portion 11 or the second holding portion 12 attached to the attachment portion 13 by rotating the rotary portion 18 and pivoting the first arm 19, the second arm 20, and the third arm 21.

The mount 22 includes a support base 23 for supporting the first holding portion 11 and the second holding portion 12. The support base 23 includes a first support portion 23A for supporting the first holding portion 11, and a second support portion 23B for supporting the second holding portion 12. One of the first holding portion 11 and the second holding portion 12 is attached to the attachment portion 13, and the other one is supported by the support base 23.

As shown in FIG. 3, the first holding portion 11 includes a plurality of first suction pads 26. In the present embodiment, the first holding portion 11 includes three first suction pads 26. The first holding portion 11 is configured to perform a holding operation to hold an article W in the first orientation. In the present embodiment, the holding operation is an operation to cause some or all of the plurality of first suction pads 26 to stick to an upward-facing face of a first article W1 in the first orientation to hold the first article W1.

Figure 5:
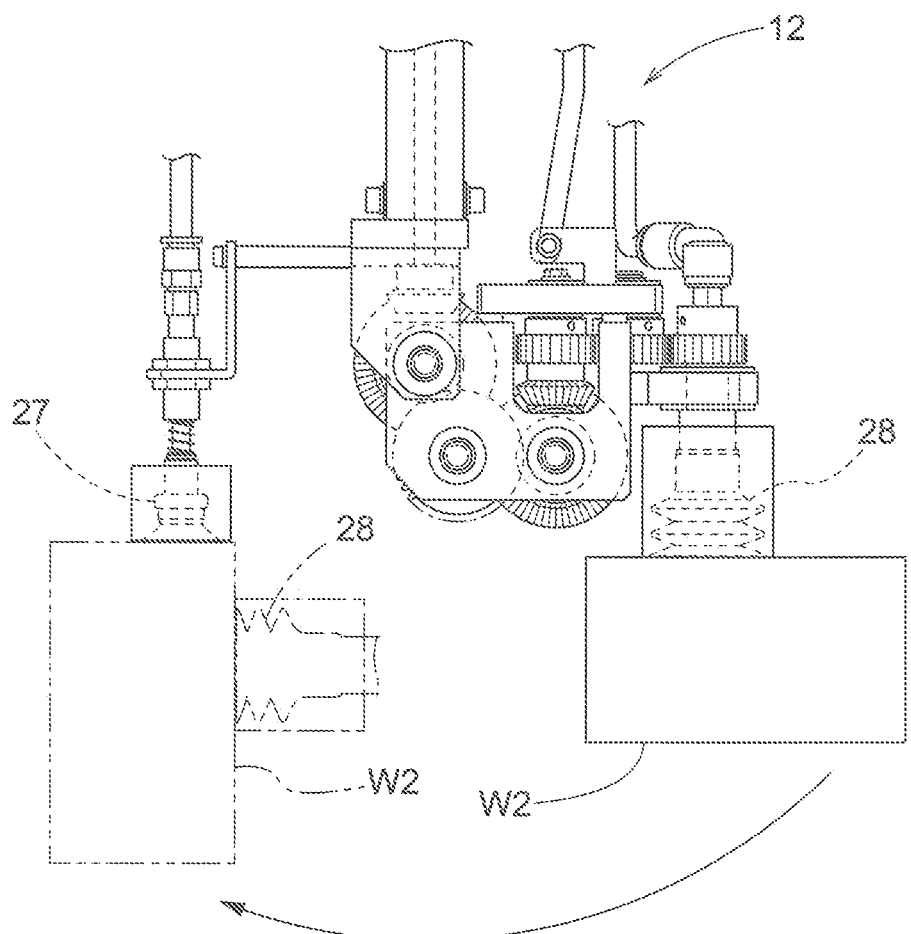
FIG. 5 is a diagram showing an orientation-change operation of the second holding portion.

As shown in FIGS. 4 and 5, the second holding portion 12 includes a second suction pad 27 and a third suction pad 28 capable of pivoting with respect to the second suction pad 27. The second holding portion 12 is configured to perform an orientation-change operation to hold an article W in the first orientation and change the orientation of the article W from the first orientation to the second orientation. In the present embodiment, the orientation-change operation is an operation to cause the third suction pad 28 to stick to an upward-facing face of a second article W2 in the first orientation to hold the article W as indicated by solid lines in FIG. 5, and then pivot the third suction pad 28 and cause the second suction pad 27 to stick to an upward-facing face of the second article W2 in the second orientation as indicated by phantom lines in FIG. 5, thereby changing the orientation of the second article W2 from the first orientation to the second orientation.

The transfer device 3 performs a first replacement operation to replace the second holding portion 12 attached to the attachment portion 13 with the first holding portion 11. In the present embodiment, the first replacement operation is an operation to detach the second holding portion 12 from the attachment portion 13 in a state where the second holding portion 12 attached to the attachment portion 13 is supported by the second support portion 23B, and then attach the first holding portion 11 supported by the first support portion 23A to the attachment portion 13.

The transfer device 3 performs a second replacement operation to replace the first holding portion 11 attached to the attachment portion 13 with the second holding portion 12. In the present embodiment, the second replacement operation is an operation to detach the first holding portion 11 from the attachment portion 13 in a state where the first holding portion 11 attached to the attachment portion 13 is supported by the first support portion 23A, and then attach the second holding portion 12 supported by the second support portion 23B to the attachment portion 13.

The transfer device 3 performs, as a transfer operation, an operation to hold an article W in the first container C1 located at the first position P1, move the article W to the second container C2 located at the second position P2, and store the article W in the second container C2.

In a state where the first holding portion 11 is attached to the attachment portion 13, the transfer device 3 performs, as a transfer operation, an operation (first transfer operation) to hold a first article W1 in the first container C1 located at the first position P1, move the first article W1 to the second container C2 located at the second position P2, and store the first article W1 in the second container C2. In the present embodiment, the first transfer operation is an operation to hold a first article W1 stored in the first orientation in the first container C1 located at the first position P1 through the holding operation performed by the first holding portion 11, store the held first article W1 in the first orientation in the second container C2 located at the second position P2, and then cause the first holding portion 11 to stop sticking to the first article W1.

In a state where the second holding portion 12 is attached to the attachment portion 13, the transfer device 3 performs, as a transfer operation, an operation (second transfer operation) to hold a second article W2 in the first container C1 located at the first position P1, move the second article W2 to the second container C2 located at the second position P2, and store the second article W2 in the second container C2. In the present embodiment, the second transfer operation involves the orientation-change operation of the second holding portion 12. That is to say, the second transfer operation is an operation to hold a second article W2 stored in the first orientation in the first container C1 located at the first position P1, then change the orientation of the second article W2 from the first orientation to the second orientation, move the second article W2 in the second orientation to the second container C2 and store the second article W2 in the second container C2, and then cause the second holding portion 12 to stop sticking to the second article W2.

Figure 6:
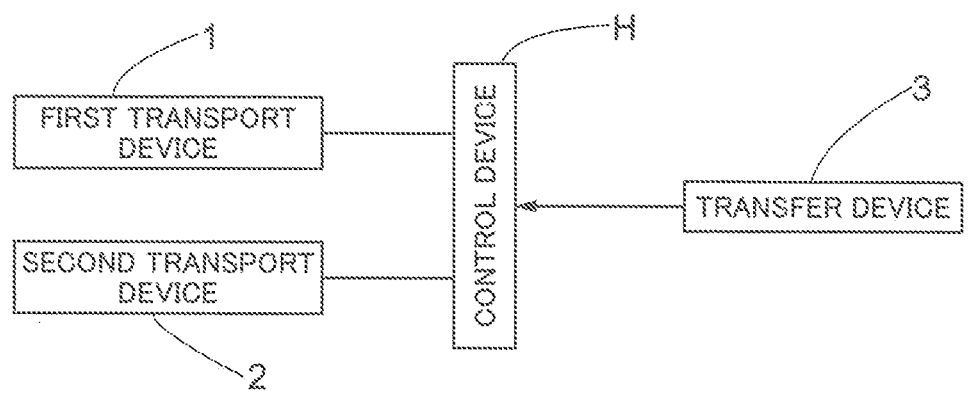
FIG. 6 is a control block diagram.
Figure 7:
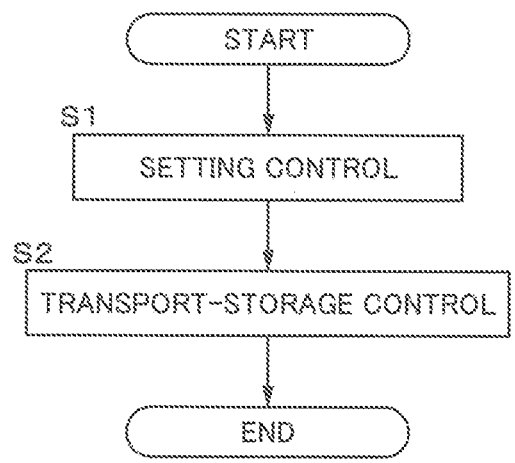
FIG. 7 is a flowchart of control performed by a control device.

As shown in FIG. 6, the article transport facility includes a control device H for controlling the first transport device 1, the second transport device 2, and the transfer device 3. As shown in FIG. 7, the control device H executes setting control (S1) to set a storing position in the second container C2 of each of a plurality of articles W to be stored in the second container C2, and transport-storage control (S2) to control the first transport device 1, the second transport device 2, and the transfer device 3 so as to store the plurality of articles W to be stored in the second container C2, at the set storing positions.

Order information is transmitted from a shipping destination to the control device H. The order information includes article information indicating one or more articles W that are to be shipped to the shipping destination. One or more second containers C2 for storing the articles W to be shipped is allocated to one piece of order information. The transport-storage control is control that is performed for one second container C2. If a plurality of second containers C2 are allocated to one order, the transport-storage control is performed more than once in accordance with the number of second containers C2.

The setting control is control to set a storing position of each of the plurality of articles W in accordance with the order of transferring the articles W so as to sequentially place the articles W from a reference position P, which is set at a position adjacent to the side wall portions 7. In the present embodiment, the reference position P is set at the target corner portion 8A, which is one of the four corner portions 8 of the placement portion 6. Also, a direction parallel to one of the four sides of the placement portion 6 is a reference direction D. In the present embodiment, a direction moving toward the second side Y2 in the longer direction is the reference direction D, as shown in FIGS. 2, 11, and 12. The setting control is control to set the storing positions so as to sequentially place articles W along the reference direction D, starting from the reference position P, as shown in FIG. 11. Although the storing positions are basically set so as to sequentially place articles W along the reference direction D, there are also cases where articles W are arranged in a direction intersecting the reference direction D (on the second side X2 in the shorter direction in the present embodiment) before finishing arranging the articles W in the reference direction D, depending on the shape and the size of the articles W to be stored.

Through the setting control, an arrangement that indicates the orientation and the position in the second container C2 of each of one or more articles W to be stored in one second container C2, and the transfer order of storing the plurality of articles W in the second container C2 are set. The set transfer order is an order in which, of the articles W to be stored in one second container C2, all first articles W1 are stored in the second container C2 (see FIG. 11), and then all second articles W2 are stored in the second container C2 (see FIG. 12).

In the transport-storage control, first transport control, second transport control, first storage control, second storage control, first replacement control, and second replacement control are executed.

The first transport control is control to cause the first transport device 1 to execute the first transport operation. By controlling the first transport device 1 through the first transport control, a first container C1 located at the first position P1 is transported from the first position P1, and another first container C1 is transported to the first position P1. The second transport control is control to cause the second transport device 2 to execute the second transport operation. By controlling the second transport device 2 through the second transport control, a second container C2 located at the second position P2 is transported from the second position P2, and another second container C2 is transported to the second position P2.

The first storage control is control executed with the first holding portion 11 attached to the attachment portion 13 of the transfer device 3, and is control to cause the transfer device 3 to execute the first transfer operation. Through the first storage control, a transfer operation to move an article W stored in the first orientation in the first container C1 to the storing position in the second container C2 while keeping the first orientation of the article W and store the article W in the second container C2 is executed by the transfer device 3. The second storage control is control executed with the second holding portion 12 attached to the attachment portion 13 of the transfer device 3, and is control to cause the transfer device 3 to execute the second transfer operation. Through the second storage control, a transfer operation to change the orientation of an article W stored in the first orientation in the first container C1 to the second orientation, move the article W to the storing position in the second container C2, and store the article W in the second container C2 is executed by the transfer device 3. Thus, the control device H executes the storage control (the first storage control and the second storage control) to control the transfer device 3 so as to store the plurality of articles W at the respective storing positions.

The first replacement control is control to cause the transfer device 3 to execute the first replacement operation. Through the first replacement control, the second holding portion 12 attached to the attachment portion 13 is replaced with the first holding portion 11. The second replacement control is control to cause the transfer device 3 to execute the second replacement operation. Through the second replacement control, the first holding portion 11 attached to the attachment portion 13 is replaced with the second holding portion 12. Thus, the control device H is configured to execute the replacement control (the first replacement control and the second replacement control) to replace one of the first holding portion 11 and the second holding portion 12 that is attached to the attachment portion 13 to the other one.

Figure 8:
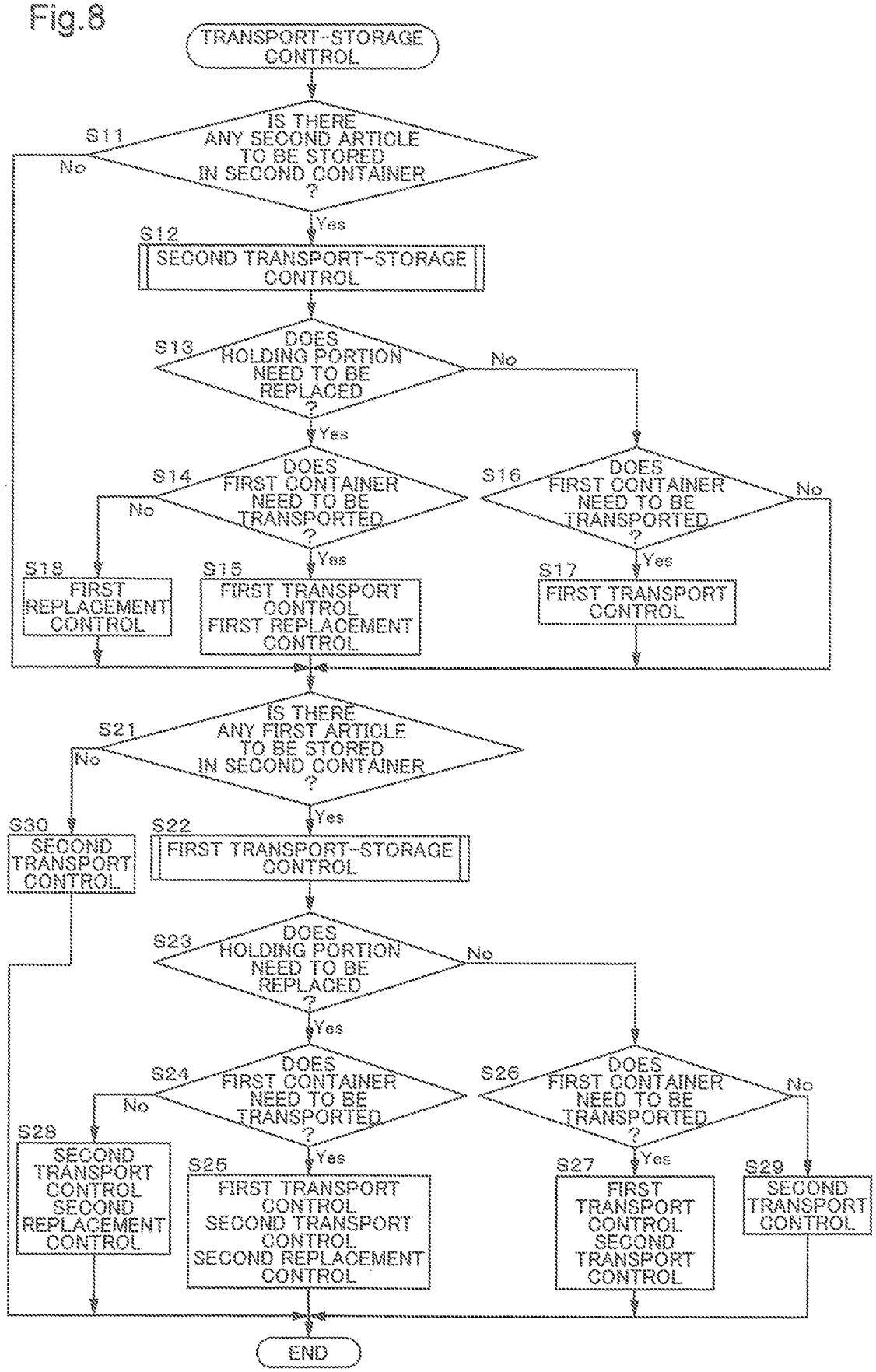
FIG. 8 is a flowchart of transport-storage control.

As shown in the flowchart in FIG. 8, in the transport-storage control, if a second article W2 to be stored in a second container C2 is present (S11: Yes), the second transport-storage control is executed (S12). If no second article W2 to be stored in a second container C2 is present (S11: No), the second transport-storage control is not executed. Also, in the transport-storage control, if a first article W1 to be stored in the second container C2 is present (S21: Yes), the first transport-storage control is executed (S22). If no first article W1 to be stored in the second container C2 is present (S21: No), the first transport-storage control is not executed. Then, after all articles W to be stored in the second container C2 have been stored as a result of executing at least either the second transport-storage control or the first transport-storage control, the second transport control is executed (S25, S27, S28, S29).

Figure 9:
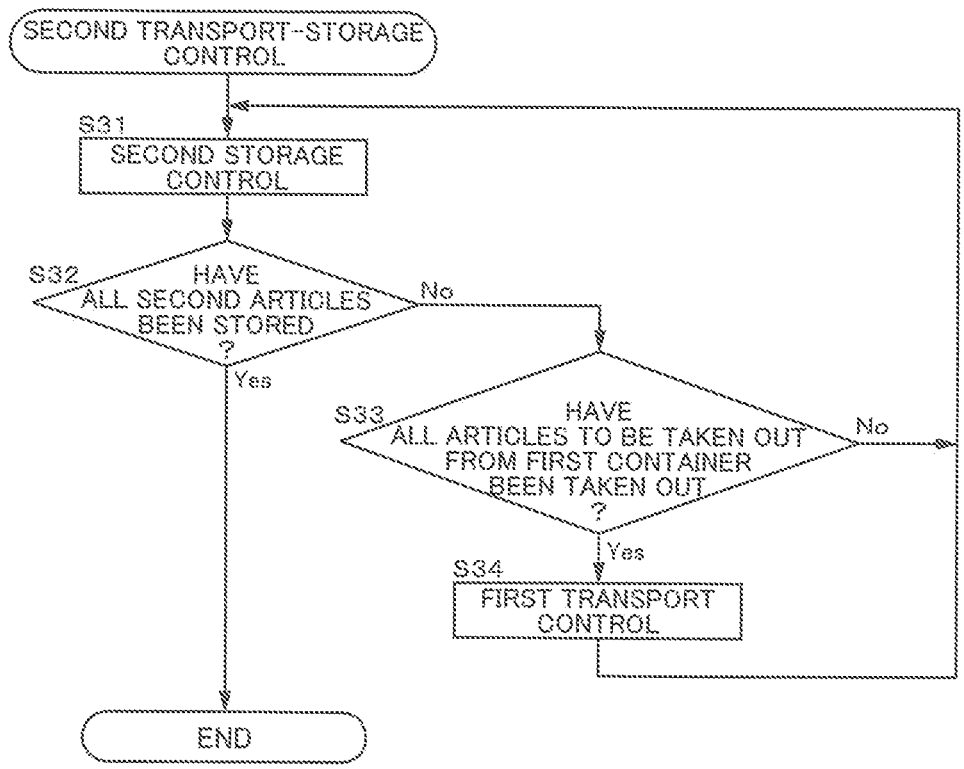
FIG. 9 is a flowchart of second transport-storage control.

In the second transport-storage control, the first transport control and the second storage control are executed so as to store all second articles W2 to be stored in one second container C2, in the second container C2. As shown in the flowchart in FIG. 9, in the second transport-storage control, the second storage control is repeatedly executed until all second articles W2 to be stored in one second container C2 have been stored in the second container C2 (S31, S32: No, S33). If a plurality of second articles W2 to be stored in one second container C2 are stored in a plurality of first containers C1 in a distributed manner, the first transport control is executed to replace the first container C1 after all second articles W2 to be taken out from one first container C1 have been taken out (S33: Yes, S34).

Figure 10:
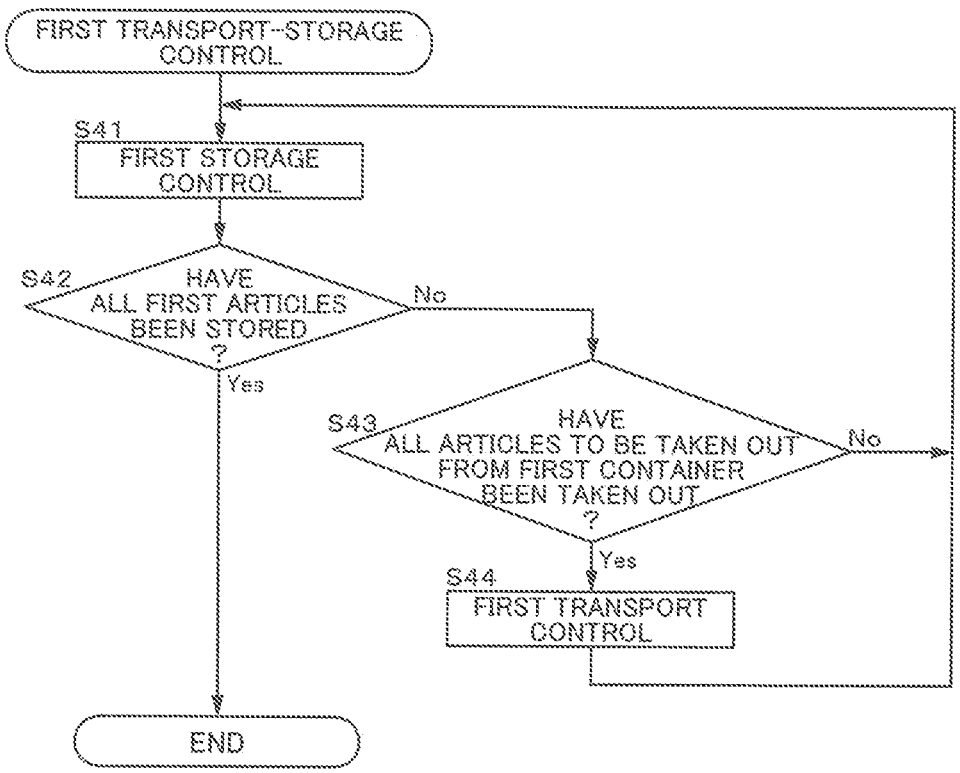
FIG. 10 is a flowchart of first transport-storage control.

In the first transport-storage control, the first transport control and the first storage control are executed so as to store all first articles W1 to be stored in one second container C2, in the second container C2. As shown in the flowchart in FIG. 10, in the first transport-storage control, the first storage control is repeatedly executed until all first articles W1 to be stored in one second container C2 have been stored in the second container C2 (S41, S42: No, S43). If a plurality of first articles W1 to be stored in one second container C2 are stored in a plurality of first containers C1 in a distributed manner, the first transport control is executed to replace the first container C1 after all first articles W1 to be taken out from one first container C1 have been taken out (S43: Yes, S44).

Returning to the flowchart in FIG. 8, the transport-storage control will be described further. After the second transport-storage control (S12) has been executed, if the second holding portion 12 attached to the attachment portion 13 needs to be replaced with the first holding portion 11 (S13: Yes), the first replacement control is executed (S15, S18). If the second holding portion 12 attached to the attachment portion 13 does not need to be replaced with the first holding portion 11 (S13: No), the first replacement control is not executed. That is to say, if, after second articles W2 have been stored in the second container C2 located at the second position P2, first articles W1 are stored in the same second container C2, the second holding portion 12 needs to be replaced with the first holding portion 11. In such cases, the first replacement control is executed. On the other hand, if only second articles W2 are to be stored in the second container C2 located at the second position P2, and if second articles W2 are to be stored in the next second container C2, the second holding portion 12 does not need to be replaced with the first holding portion 11. In such cases, the first replacement control is not executed.

After the second transport-storage control (S12) has been executed, if the first container C1 located at the first position P1 needs to be transported (S14: Yes, S16: Yes), the first transport control is executed (S15, S17). If the first container C1 located at the first position P1 does not need to be transported (S14: No, S16: No), the first transport control is not executed. That is to say, if no first article W1 to be stored in the second container C2 in the next first transport-storage control (S22) is present in the first container C1 located at the first position P1, the first container C1 located at the first position P1 needs to be transported. In such cases, the first transport control is executed. On the other hand, if a first article W1 to be stored in the second container C2 in the next first transport-storage control (S22) is present in the first container C1 located at the first position P1, the first container C1 located at the first position P1 does not need to be transported. In such cases, the first transport control is not executed.

After the first transport-storage control (S22) has been executed, if the first holding portion 11 attached to the attachment portion 13 needs to be replaced with the second holding portion 12 (S23: Yes), the second replacement control is executed (S25, S28). If the first holding portion 11 attached to the attachment portion 13 does not need to be replaced with the second holding portion 12 (S23: No), the second replacement control is not executed. That is to say, if second articles W2 are to be stored in the next second container C2 in the next transport-storage control (S12), the first holding portion 11 attached to the attachment portion 13 needs to be replaced with the second holding portion 12. In such cases, the second replacement control is executed. On the other hand, if no second article W2 is to be stored in the next second container C2 but only first articles W1 are to be stored therein, the first holding portion 11 attached to the attachment portion 13 does not need to be replaced with the second holding portion 12. In such cases, the second replacement control is not executed.

After the first transport-storage control (S22) has been executed, all second articles W2 and first articles W1 that are to be stored in the second container C2 located at the second position P2 have been stored therein, and therefore the second transport control is executed (S25, S27, S28, S29). If no first article W1 to be stored in the second container C2 is present (S21: No), all articles W (only second articles W2) to be stored in the second container C2 located at the second position P2 have been stored therein, and therefore the second transport control is executed (S30). After the first transport-storage control (S22) has been executed, if the first container C1 located at the first position P1 needs to be transported (S24: Yes, S26: Yes), the first transport control is executed (S25, S27). If the first container C1 located at the first position P1 does not need to be transported (S24: No, S26: No), the first transport control is not executed. That is to say, if no second article W2 to be stored in the next second container C2 in the next transport-storage control (S12) is present in the first container C1 located at the first position P1, the first container C1 located at the first position P1 needs to be transported. In such cases, the first transport control is executed. On the other hand, if a second article W2 to be stored in the next second container C2 in the next second transport-storage control (S12) is present in the first container C1 located at the first position P1, the first container C1 located at the first position P1 does not need to be transported. In such cases, the first transport control is not executed.

The control device H executes the transport-storage control as described above. If first articles W1 and second articles W2 are stored in different first containers C1, the second holding portion 12 attached to the attachment portion 13 needs to be replaced with the first holding portion 11 (S13: Yes) and the first container C1 located at the first position P1 needs to be transported (S14: Yes), after the second transport-storage control has been executed (S12). In such cases, the first replacement control is executed in parallel with the first transport control (S15). After the first transport-storage control has been executed (S22), if a second article W2 is to be stored in the next second container C2 in the next second transport-storage control (S12), the first holding portion 11 attached to the attachment portion 13 needs to be replaced with the second holding portion 12 (S23: Yes). In such cases, the second replacement control is executed in parallel with the second transport control (S25, S28).

As described above, if both first articles W1 and second articles W2 are to be stored in the second container C2, the control device H executes the storage control (second storage control) for all second articles W2, of a plurality of articles W to be stored in one second container C2, then executes the replacement control (first replacement control) to replace the second holding portion 12 attached to the attachment portion 13 with the first holding portion 11, and thereafter executes the storage control (first storage control) for all first articles W1.

2. Other Embodiments

Next, other embodiments of the article transport facility will be described.

(1) In the above embodiment, the first replacement control is executed in parallel with the first transport control, and the second replacement control is executed in parallel with the second transport control. However, the first replacement control and the first transport control may be executed at different timings, rather than in parallel, and the second replacement control and the second transport control may be executed at different timings, rather than in parallel.

(2) In the above embodiment, the storing positions are set so as to sequentially place articles W from the reference position P along the reference direction D parallel to one side of the placement portion 6. However, the storing positions need only be set so as to sequentially place articles W from the reference position P adjacent to the side wall portions 7. For example, the storing positions may alternatively be set so as to sequentially place articles W from the reference position P along a direction intersecting the reference direction D that is parallel to one side of the placement portion 6. Furthermore, for example, the reference position P may be set at a position other than the corner portions 8 of the placement portion 6.

(3) In the above embodiment, the second holding portion 12 is configured to hold an article W in the first orientation and perform the orientation-change operation to change the orientation of the article W from the first orientation to the second orientation. However, the second holding portion 12 may alternatively be configured to hold an article W in the second orientation and not perform the orientation-change operation. In this case, the second article W2 is stored in the second orientation in the first container C1.

(4) The above embodiment has described, as an example, a configuration in which the placement portion 6 of the second container C2 has a rectangular shape, such as a square or a rectangle, but the shape of the placement portion 6 is not limited to the rectangular shape. For example, the shape of the placement portion 6 may alternatively be a circular shape, an elliptical shape, a triangular shape, a hexagonal shape, or the like. Although the above embodiment has described, as an example, a configuration in which the first container C1 has the same shape as the second article C2, this need not be the case, and the shape of the first container C1 may differ from the shape of the second container C2.

(5) In the above embodiment, one type of articles W are stored in the first container C1, but a plurality of types of articles W may be stored in the first container C1.

(6) In the above embodiment, the first orientation is an orientation in which, of the three pairs of surfaces of an article W, one of the surfaces with the largest area faces the placement portion 6, and the second orientation is an orientation in which one of the surfaces with the smallest area faces the placement portion 6. However, the first orientation may alternatively be an orientation in which, of the three pairs of surfaces of an articles W, one of the surfaces with the second largest area faces the placement portion 6. Alternatively, the second orientation may be an orientation in which, of the three pairs of surfaces of an article W, one of the surfaces with the second smallest area faces the placement portion 6.

(7) Note that the configuration disclosed in the above embodiment can also be applied in combination with configurations disclosed in other embodiments unless inconsistency occurs. Regarding other configurations as well, the embodiments disclosed in the present specification are merely examples in all respects. Accordingly, various modifications can be made as appropriate without departing from the gist of the present disclosure.

3. Summary of the Above Embodiment

The summary of the above-described article transport facility will be described below.

An article transport facility includes: a transfer device that performs a transfer operation to hold an article and store the article in a container; and a control device that controls the transfer device, wherein the container has a placement portion for placing an article thereon, and a side wall portion erected around the placement portion, assuming that orientations of the article to be stored in the container include a first orientation and a second orientation in which an area in contact with the placement portion is smaller than that in the first orientation when article is in a state of being placed on the placement portion, an article to be stored in the first orientation in the container is a first article, and an article to be stored in the second orientation in the container is a second article, the transfer device includes a first holding portion for holding the first article, a second holding portion for holding the second article, an attachment portion to which one of the first holding portion and the second holding portion is selectively attached, and a moving portion for moving the first holding portion or the second holding portion that is attached to the attachment portion, the control device is configured to execute setting control to set a storing position, in the container, of each of a plurality of articles to be stored in the container, storage control to control the transfer device so as to store each of the plurality of articles at the storing position, and replacement control to replace one of the first holding portion and the second holding portion that is attached to the attachment portion with the other one, the setting control is control to set the storing position in accordance with an order of transferring the plurality of articles so as to sequentially place the articles from a reference position that is set at a position adjacent to the side wall portion, and the control device executes the storage control for all second articles, of a plurality of articles to be stored in one container, then executes the replacement control to replace the second holding portion attached to the attachment portion with the first holding portion, and thereafter executes the storage control for all first articles.

According to this configuration, an article can be stored in the first orientation in the container using the transfer device by attaching the first holding portion to the attachment portion of the transfer device, and an article can be stored in the second orientation in the container using the transfer device by attaching the second holding portion to the attachment portion of the transfer device. Thus, when an article is stored in the container, the article can be stored while selecting either the first orientation or the second orientation, and therefore, storage efficiency of storing the article in the container can be increased. Here, in the second orientation, the area in contact with the placement portion is smaller than that in the first orientation, and therefore the orientation stability in the second orientation is more stable than in the first orientation. For this reason, the orientation stability of the second article in the container can be more readily increased using the side wall portion by storing, in the container, the second article to be stored in the second orientation, prior to the first article, so as to sequentially arrange the articles from the reference position adjacent to the side wall portions of the container.

After the storage control has been executed for all second articles, of the plurality of articles to be stored in one container, the replacement control to replace the second holding portion attached to the attachment portion with the first holding portion is executed, and thereafter the storage control is executed for all first articles. Thus, the holding portion need only be replaced only once during the entire transfer operation for the articles with respect to one container. Accordingly, the time required for transfer can be shortened compared with the case of replacing the holding portion more than once.

Here, it is preferable that the article transport facility further includes: a first transport device for transporting a first container; and a second transport device for transporting a second container that is the container, wherein the first transport device performs a first transport operation to transport the first container located at a first position from the first position, and transport another first container to the first position, the second transport device performs a second transport operation to transport the second container located at a second position from the second position, and transport another second container to the second position, the transfer device performs, as the transfer operation, an operation to hold an article in the first container located at the first position, move the article to the second container located at the second position, and store the article in the second container, and the control device executes the replacement control in parallel with the first transport operation or the second transport operation.

In this configuration, the first container is moving while the first transport operation is executed, and therefore the transfer device cannot hold an article stored in the first container. Also, the second container is moving while the second transport operation is executed, and therefore the transfer device cannot store a held article in the second container. According to this configuration, since the replacement control is executed in parallel with the first transport operation or the second transport operation, the replacement control can be executed using the time during which an article cannot be held or stored by the transfer device. Accordingly, the time required for transfer can be shortened.

It is preferable that the first article and the second article are stored in different first containers, and the control device executes the replacement control to replace the second holding portion with the first holding portion in parallel with the first transport operation, and executes the replacement control to replace the first holding portion with the second holding portion in parallel with the second transport operation.

In this configuration, after the storage control for all second articles, of a plurality of articles to be stored in one container, has been executed, the first transport operation to replace a first container in which second articles are stored with a first container in which first articles are stored needs to be performed, and the replacement control to replace the second holding portion with the first holding portion also needs to be performed. By executing this replacement control in parallel to the first transport operation, the time required for transfer can be shortened. Also, after the storage control for all first articles, of a plurality of articles to be stored in one container, has been executed, the second transport operation to replace the second container with a new one needs to be performed, and the replacement control to replace the first holding portion with the second holding portion also needs to be performed. By executing this replacement control in parallel to the second transport operation, the operation to transfer articles to the next second container can be promptly started.

It is preferable that the placement portion has a rectangular shape, and the side wall portion is provided along each of four sides of the placement portion, and the setting control is control to set the reference position at one corner portion of the placement portion, and set the storing position so as to sequentially place articles along a reference direction that is a direction parallel to one of the four sides of the placement portion.

According to this configuration, the second article that is relatively less stable can be stored in the second container prior to the first article, and the second articles can be sequentially stored from the reference position along the reference direction parallel to a side wall portion of the container. Accordingly, the orientation stability of the second articles in the container can be more readily increased using the side wall portions.

It is preferable that the second holding portion is configured to perform an orientation-change operation to hold an article in the first orientation and change an orientation of the article from the first orientation to the second orientation.

According to this configuration, by storing an article in the first orientation in the first container, the article stored in the first container can be stored in the second container while keeping the first orientation when stored, and can also be stored after changing the orientation of the article from the first orientation to the second orientation. Accordingly, an article does not need to be stored in advance in the second orientation in the first container, making it easier to stabilize the orientation of the article in the first container. Furthermore, since articles of the same type do not need to be separately stored in a container in which the articles are stored in the first orientation and a container in which the articles are stored in the second orientation, the number of first containers can also be reduced.

Industrial Applicability

The technology according to the present disclosure can be used in an article transport facility that includes a transfer device that performs a transfer operation to hold an article and stores the article in a container, and a control device that controls the transfer device.

Description Of Reference Signs

1: First transport device
2: Second transport device
3: Transfer device
6: Placement portion
7: Side wall portion
8: Corner portion
11: First holding portion
12: Second holding portion
13: Attachment portion
14: Moving portion
C1: First container
C2: Second container (container)
D: Reference direction
H: Control device
P: Reference position
P1: First position
P2: Second position
W: Article
W1: First article
W2: Second article

The invention claimed is:

1. An article transport facility comprising:
a transfer device that performs a transfer operation to hold an article and store the article in a container; and
a control device that controls the transfer device, wherein:
the container has a placement portion for placing an article thereon, and a side wall portion erected around the placement portion,
the article to be stored in the container includes a first orientation and a second orientation in which an area in contact with the placement portion is smaller than that in the first orientation when the article is placed on the placement portion, and an article to be stored in the first orientation in the container is a first article and an article to be stored in the second orientation in the container is a second article, the transfer device comprises:
a first holding portion for holding the first;
a second holding portion for holding the second article;
an attachment portion to which one of the first holding portion and the second holding portion is selectively attached; and
a moving portion for moving the first holding portion or the second holding portion that is attached to the attachment portion,
the control device is configured to execute setting control to set a storing position, in the container, of each of a plurality of articles to be stored in the container, storage control to control the transfer device so as to store each of the plurality of articles at the storing position, and replacement control to replace one of the first holding portion and the second holding portion that is attached to the attachment portion with the other one,
the setting control is a control to set the storing position in accordance with an order of transferring the plurality of articles so as to sequentially place the articles from a reference position that is set at a position adjacent to the side wall portion, and
the control device executes the storage control for all second articles, of a plurality of articles to be stored in one container, then executes the replacement control to replace the second holding portion attached to the attachment portion with the first holding portion, and thereafter executes the storage control for all first articles.

2. The article transport facility according to claim 1, further comprising:
a first transport device for transporting a first container; and
a second transport device for transporting a second container that is the container, wherein:
the first transport device performs a first transport operation to transport the first container located at a first position from the first position, and transport another first container to the first position,
the second transport device performs a second transport operation to transport the second container located at a second position from the second position, and transport another second container to the second position,
the transfer device performs, as the transfer operation, an operation to hold an article in the first container located at the first position, move the article to the second container located at the second position, and store the article in the second container, and
the control device executes the replacement control in parallel with the first transport operation or the second transport operation.

3. The article transport facility according to claim 2, wherein the placement portion has a rectangular shape, and the side wall portion is provided along each of four sides of the placement portion, and
wherein the setting control is control to set the reference position at one corner portion of the placement portion, and set the storing position so as to sequentially place articles along a reference direction that is a direction parallel to one of the four sides of the placement portion.

4. The article transport facility according to claim 2, wherein the second holding portion is configured to perform an orientation-change operation to hold an article in the first orientation and change an orientation of the article from the first orientation to the second orientation.

5. The article transport facility according to claim 2, wherein the first article and the second article are stored in different first containers, and
wherein the control device executes the replacement control to replace the second holding portion with the first holding portion in parallel with the first transport operation, and executes the replacement control to replace the first holding portion with the second holding portion in parallel with the second transport operation.

6. The article transport facility according to claim 5, wherein the placement portion has a rectangular shape, and the side wall portion is provided along each of four sides of the placement portion, and
wherein the setting control is control to set the reference position at one corner portion of the placement portion, and set the storing position so as to sequentially place articles along a reference direction that is a direction parallel to one of the four sides of the placement portion.

7. The article transport facility according to claim 5, wherein the second holding portion is configured to perform an orientation-change operation to hold an article in the first orientation and change an orientation of the article from the first orientation to the second orientation.

8. The article transport facility according to claim 1, wherein the placement portion has a rectangular shape, and the side wall portion is provided along each of four sides of the placement portion, and
wherein the setting control is control to set the reference position at one corner portion of the placement portion, and set the storing position so as to sequentially place articles along a reference direction that is a direction parallel to one of the four sides of the placement portion.

9. The article transport facility according to claim 8, wherein the second holding portion is configured to perform an orientation-change operation to hold an article in the first orientation and change an orientation of the article from the first orientation to the second orientation.

10. The article transport facility according to claim 1, wherein the second holding portion is configured to perform an orientation-change operation to hold an article in the first orientation and change an orientation of the article from the first orientation to the second orientation.

* * * * *

UNITED STATES PATENT AND TRADEMARK OFFICE
CERTIFICATE OF CORRECTION

| | | |
|---|---|---|
| PATENT NO. | : 11,760,519 B2 | Page 1 of 1 |
| APPLICATION NO. | : 17/293606 | |
| DATED | : September 19, 2023 | |
| INVENTOR(S) | : Mitsuo Morikubo et al. | |

It is certified that error appears in the above-identified patent and that said Letters Patent is hereby corrected as shown below:

In the Claims

Column 15, Line 20, Claim 1, delete "first;" and insert -- first article; --

Signed and Sealed this
Seventh Day of November, 2023

Katherine Kelly Vidal

Katherine Kelly Vidal
*Director of the United States Patent and Trademark Office*